United States Patent [19]

Helmer-Metzmann et al.

[11] Patent Number: 5,510,424
[45] Date of Patent: Apr. 23, 1996

[54] HOMOGENEOUS POLYMER ALLOYS BASED ON SULFONATED AROMATIC POLYETHER KETONES

[75] Inventors: Freddy Helmer-Metzmann, Mainz; Otto Hermann-Schönherr, Bensheim; Uwe Kampschulte, Hattersheim, all of Germany

[73] Assignee: Hoechst Aktiengesellschaft, Frankfurt, Germany

[21] Appl. No.: 383,620

[22] Filed: Feb. 2, 1995

Related U.S. Application Data

[63] Continuation of Ser. No. 173,999, Dec. 28, 1993, abandoned.

[30] Foreign Application Priority Data

Dec. 30, 1992 [DE] Germany .......................... 42 44 526.4

[51] Int. Cl.$^6$ ..................................................... C08L 77/00
[52] U.S. Cl. ............................................ 525/420; 525/419
[58] Field of Search ............................................... 525/420

[56] References Cited

U.S. PATENT DOCUMENTS

| | | | |
|---|---|---|---|
| 3,745,141 | 10/1973 | Bonnard et al. | 525/420 |
| 4,921,889 | 5/1990 | Lausberg et al. | 523/400 |
| 5,134,202 | 7/1992 | Harris et al. | 525/436 |
| 5,177,158 | 1/1993 | Noma | 525/420 |
| 5,247,017 | 9/1993 | Noma | 525/133 |

FOREIGN PATENT DOCUMENTS

| | | | |
|---|---|---|---|
| 0337626A1 | 10/1989 | European Pat. Off. | |
| 0381172 | 8/1990 | European Pat. Off. | |
| 3444339 | 6/1986 | Germany | |
| 1334857 | 10/1973 | United Kingdom | 525/420 |
| 2216134 | 10/1989 | United Kingdom | |

OTHER PUBLICATIONS

English language reference identified as HOE 89/F 038 which relates to EP 0,381,172.

*Primary Examiner*—Ana L. Carrillo
*Attorney, Agent, or Firm*—Curtis, Morris & Safford

[57] ABSTRACT

Homogeneous polymer alloys based on sulfonated, aromatic polyether ketones

Homogeneous polymer alloys comprising sulfonated, aromatic polyether ketones and at least one polyamide as the main constituents, wherein the polyamide is a completely aromatic polyamide.

13 Claims, No Drawings

HOMOGENEOUS POLYMER ALLOYS BASED ON SULFONATED AROMATIC POLYETHER KETONES

This application is a continuation of application Ser. No. 08/173,999, filed Dec. 28, 1993 now abandoned.

The invention relates to polymer alloys which comprise sulfonated, aromatic polyether ketones and at least one completely aromatic polyamide as the main constituents in a homogeneous mixture, a process for the preparation of the alloys and their use.

The principle of modification of the properties of polymer materials by preparation of homogeneous polymer alloys is known. In this way, technologically important properties of polymer materials can be improved or adjusted in a controlled manner, these properties often being realizable only with difficulty, if at all, in another manner, such as, for example, by copolymerization.

A fundamental prerequisite for the possibility of preparation of a homogeneous polymer alloy is the complete miscibility of the alloy components. However, complete miscibility is an unusual property in polymer systems, which normally tend to form multiphase systems (Polymer, volume 24, page 60 (1983)).

Even modern thermodynamic theories have had only limited success to date regarding prediction of miscibility. It has therefore been doubted that any practical theory can be developed which takes into account the real complexities imparted to polymer-polymer interactions by nature (Macromolecules, Volume 16, page 753 (1983)).

The ability to predict with certainty the properties of an alloy from the properties of its individual components is therefore as yet still a long way off, so that alloying of polymers is still largely empirical (Olabisi, Robeson, Shaw: Polymer-Polymer-Miscibility, Academic Press, New York 1979, pages 321–327). In particular, the homogeneous miscibility of polymer alloys which comprise highly interactive polymers cannot be predicted, in spite of a very large number of experimental and theoretical studies in this field (Journal of Polymer Science, Polymer Physics Edition, volume 21, page 11 (1983)).

In industry, however, there is very great interest in homogeneous mixed polymer alloys, since their properties can be adjusted in a controlled manner to suit particular requirements by varying the alloy components and their mixing ratios.

Sulfonated polyether ketones are already known. They can be prepared by conventional sulfonation processes (for example in accordance with EP-A-008895 and EP-A-041780), but are also accessible by a novel process (German Patent Application P 4 219 077.0). They are distinguished in particular by a high heat resistance, an excellent hydrophilicity and by a good solubility in organic solvents, such as N-methylpyrrolidone or N,N-dimethylformamide.

Sulfonated polyether ketones have already been alloyed with partly aliphatic polyamides (EP-A-0 337 626). However, the lack of chemical stability of these alloys, especially toward polar organic solvents, is a disadvantage in particular in respect of applications where hydrophilic properties of materials coupled with stability to solvents are required.

Thus, for example, fibers are required to achieve a certain water absorption capacity in order to guarantee good wearing comfort of fabrics. In respect of their use for "fouling-resistant" semipermeable membranes, i.e. semipermeable membranes with a low tendency to block, the materials employed must also display adequate hydrophilicity.

Furthermore, it is necessary for the mechanical properties of a polymer alloy to be adapted to suit the particular desired field of use.

This invention was therefore based on the object of providing homogeneous polymer alloys based on sulfonated polyether ketones and polyamides, the water absorption capacity of which and the mechanical properties of which can be adjusted in a controlled manner by varying the components of the mixture and/or the mixing ratios. Furthermore, the novel systems should be resistant to chemicals and heat.

This object is achieved by providing homogeneous polymer alloys which comprise sulfonated, aromatic polyether ketones and at least one polyamide as the main constituents and in which the polyamide is a completely aromatic polyamide. A completely aromatic polyamide is derived formally from an aromatic dicarboxylic acid and an aromatic diamine. In addition to the sulfonated, aromatic polyether ketone and completely aromatic polyamide, the homogeneous polymer alloy according to the invention can also contain other polymers to a lesser extent. The alloys according to the invention are preferably free from partly aliphatic polyamides according to EP-A-337 626.

According to one embodiment of the invention, the polymer alloy comprises at least one sulfonated, aromatic polyether ketone and at least one completely aromatic polyamide.

In addition to the sulfonated, aromatic polyether ketone and the completely aromatic polyamide, even smaller amounts of poly-N-vinyl-2-pyrrolidone can also be present— according to one embodiment of the invention. The polymer alloy can also comprise a copolymer which is built up from the monomers N-vinyl-2-pyrrolidone and vinyl acetate, in addition to the poly-N-vinyl-2-pyrrolidone. According to another embodiment of the invention, a copolymer of N-vinyl-2-pyrrolidone and vinyl acetate (but no poly-N-vinyl-2-pyrrolidone) is present in the polymer alloy, in addition to the sulfonated, aromatic polyether ketone and the completely aromatic polyamide.

If the polymer alloy comprises a sulfonated, aromatic polyether ketone and a completely aromatic polyamide, each of the two constituents is present in an amount of 1 to 99% by weight.

If the polymer alloy also comprises poly-N-vinyl- 2-pyrrolidone and/or a copolymer of N-vinyl-2-pyrrolidone and vinyl acetate, it is advantageous if the content of sulfonated, aromatic polyether ketone is 5 to 60% by weight and the content of completely aromatic polyamide is 20 to 90% by weight. The content of polyvinylpyrrolidone and/or a copolymer of N-vinyl-2-pyrrolidone and vinyl acetate is preferably 0.1 to 30% by weight.

It is advantageous if the sulfonated, aromatic polyether ketones are built up from recurring units of the formula I

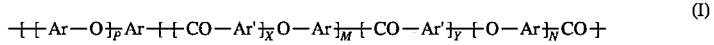

(I)

in which

Ar is a phenylene ring with para and/or meta bonds,

Ar'— is a phenylene, naphthylene, biphenylene or anthrylene unit or another divalent aromatic unit, X, M and N independently of one another are zero or 1, Y is zero, 1, 2 or 3 and p is 1, 2, 3 or 4, and in which, in the formula I, 20 to 100% of the O-phenylene-O units are substituted by an SO$_3$H group. Preferably, in the formula I, the indices p, X and M are coordinated with one another such that $p=2-(1-X)\cdot M$.

Sulfonated polyether ketones which are preferably employed are those of the formula II

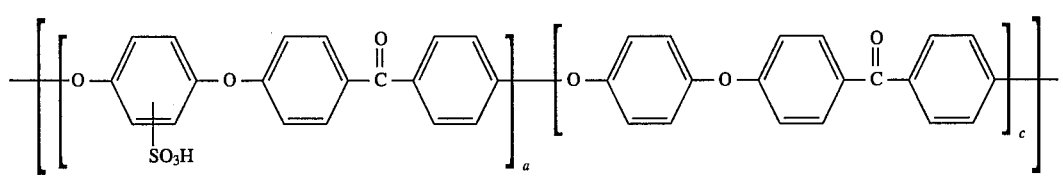

in which a is a number from 0.2 to 1, c is a number from 0 to 0.8 and the sum of a+c=1, of the formula III

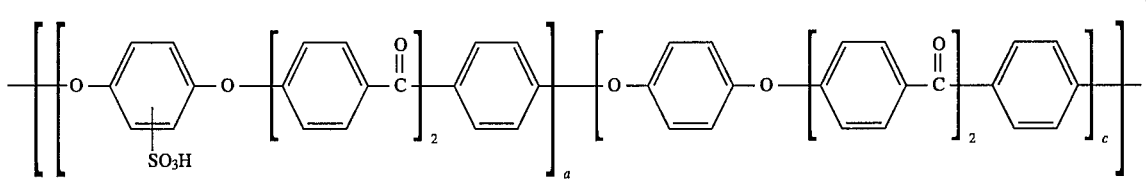

in which a is a number from 0.2 to 1, c is a number from 0 to 0.8 and the sum of a+c=1, and of the formula IV

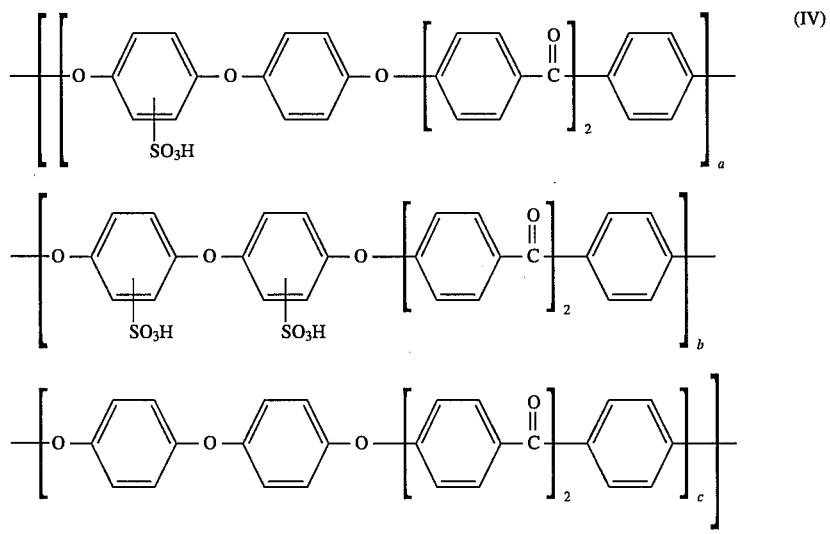

in which a is a number from 0 to 1, b is a number from 0 to 1, c is a number from 0 to 0.5 and the sum of a+b+c=1.

Sulfonated polyether ketones which are composed of at least two different recurring units of the formulae II, III and IV furthermore can also be employed.

They can be prepared by copolymerization of units of the formulae II, III and IV (but which are free from sulfonic acid groups) and subsequent sulfonation of the copolymer obtained.

The sulfonated polyether ketones employed preferably have molecular weights, stated as the weight-average, in the range from 10,000 to 60,000 g/mol, in particular in the range from 20,000 to 30,000 g/mol.

The sulfonated polyether ketones can be prepared by a customary sulfonation process (for example EP-A0-008 895 and EP-A0-041 780). Sulfonation is preferably carried out by the process described in German Patent Application P 4 219 077.0, which is expressly referred to here.

The polymer alloys according to the invention comprise, as the completely aromatic copolyamide, preferably at least one copolyamide which contains structural units of the formula (V)

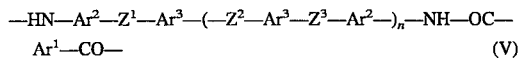

in which

— Ar$^1$— is a 1,4-phenylene radical or another divalent (C$_6$-C$_{12}$)-aromatic or heteroaromatic radical optionally containing sulfonic acid groups or ether bridges, which is optionally substituted by one or two branched or unbranched C$_1$-C$_4$-alkyl or alkoxy radicals or by one or more halogen atoms, for example chlorine, fluorine or bromine, —Ar$^2$— and —Ar$^3$— are identical or different 1,2-phenylene, 1,3-phenylene or 1,4-phenylene radicals, which are optionally substituted by one or two branched or unbranched C$_1$-C$_4$-alkyl or alkoxy radicals or by one or more halogen atoms, for example chlorine, fluorine or bromine, —Z$^1$, —Z$^2$— and —Z$^3$— independently of one another are a direct bond or one of the following divalent radicals: —O—, —C—(CH$_3$)$_2$—, —C(CF$_3$)$_2$—, —SO$_2$— or —O—Ar$^2$—O—, in which —Ar$^2$— has the abovementioned meaning, and n is an integer, in particular n=0, 1 or 2.

Preferred copolyamides are those of the formula V which contain the structural unit

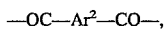  (A)

and three different structural units of the formulae

  (B)

and

  (D)

wherein in each case at least one structural unit B and D should be present and Ar$^2$ can have different meanings in B and D.

Preferably, n=0 here.

Examples of the unit —Ar$^1$— in the recurring units A are

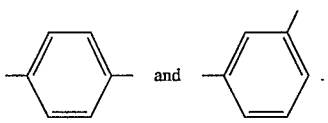

in particular

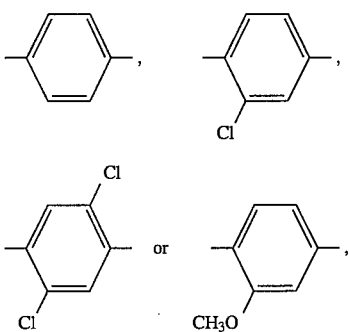

Examples of —Ar$^2$— in the recurring units B are substituted or unsubstituted p-phenylene units, such as, for example,

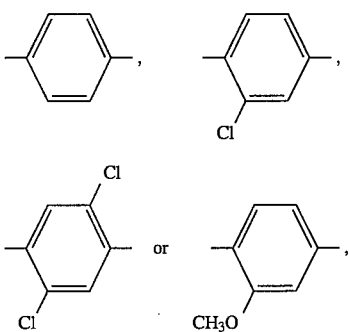

and substituted or unsubstituted m-phenylene units, such as, for example,

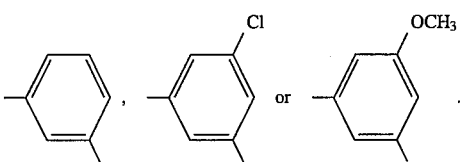

Examples of Ar$^2$—Z$^1$—Ar$^3$ in the recurring units D are

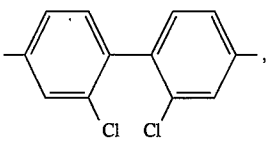

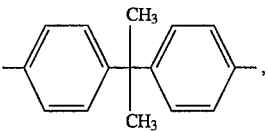

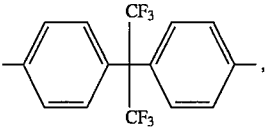

in particular

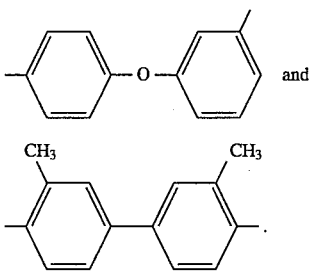

The following are particularly preferred:

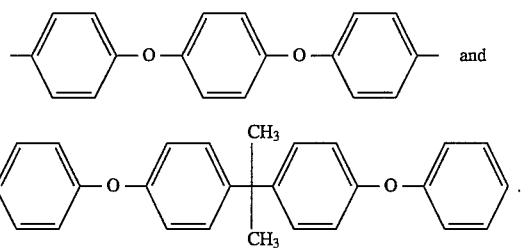

Preferably, in the completely aromatic copolyamide, the structural units A, B and D are present in the molar ratios of B/A=0.3–0.9 and D/A=0.1–0.7, and the molar ratio of (B+D)/A is 0.9 to 1.1.

The diamines B', B", D' and D" which are necessary for the structural units (B) and (D) and are employed in the synthesis of the completely aromatic copolyaramides having the structural units A, B and D are usually employed in the following concentrations:

Diamine (B'): 0 to 50 mol %

Second diamine (B"): 0 to 60 mol %

Diamines (D', D"): 10 to 70 mol % (per diamine unit (D') or (D"))

based on 100 mol % of the acid component (A') employed, the molar ratio of diamine components to acid components being 0.90:1.10 to 1.10:0.90, preferably 1:1.

The copolyamides mentioned here can be prepared by solution condensation of the aromatic di-acid chlorides with the mixtures of the aromatic diamines, analogously to the processes described in the European Patents EP-A-0 199 090, EP-A-0 322 837 and EP-A-0 445 673 and in the German Patent Applications P 41 04 394, P 41 21 801 and P 42 02 16 5.0, in aprotic, polar solvents of the amide type, such as, for example, in N,N-dimethylacetamide or, in particular, in N-methyl-2-pyrrolidone. If appropriate, halide salts of the first and second group of the Periodic Table can be added to these solvents in a known manner in order to increase the dissolving capacity and to stabilize the polyamide solutions. Preferred additions are calcium chloride and/or lithium chloride.

The intrinsic viscosity, which is a measure of the average chain length of the polymers formed, of the copolyamides used as alloy components is preferably between 50 and 1000 cm³/g, preferably between 100 and 500 cm³/g, especially preferably between 150 and 350 cm³/g. It was determined on solutions of in each case 0.5 g of polymer in 100 ml of 96% strength sulfuric acid at 25° C.

The molecular weights of the polyvinylpyrrolidone (=PVP) and of the copolyvinylpyrrolidone/polyvinyl acetate (abbreviated to: CoPVPAc), the other possible components of the homogeneous polymer alloys according to the invention, are, stated as the weight-average, usually 1000 to 3 million, preferably 20,000 to 200,000, in particular 40,000 to 100,000.

The homogeneously miscible polymer alloys according to the invention can be prepared from a common solution which comprises at least one sulfonated, aromatic polyether ketone and polyvinylpyrrolidone and/or CoPVPAc or which comprises at least one sulfonated, aromatic polyether ketone and at least one polyaramide or at least one sulfonated polyether ketone, at least one polyaramide and polyvinylpyrrolidone and/or CoPVPAc, in an aprotic organic solvent, for example dimethylformamide, dimethylsulfoxide, N-methylpyrrolidone or N,N-dimethylacetamide. For this, for example, the polyaramide can be subjected to polycondensation in the corresponding solvent, the sulfonated polyether ketone (and if appropriate polyvinylpyrrolidone and/or CoPVPAc) can be dissolved in a suitable concentration and a mixture of the particular polymer solutions in the calculated ratio of amounts can then be prepared.

If appropriate, halide salts of the first and second group of the Periodic Table can be added to these solvents in a known manner in order to increase the solubility and to stabilize the polyamide solutions.

Alternatively, sulfonated polyether ketone (and if appropriate polyvinylpyrrolidone and/or CoPVPAc) can be added directly in the dry form to the polyaramide solution when the polycondensation has ended.

For preparation of the ternary alloy, polycondensation of the polyaramide in the presence of polyvinylpyrrolidone or CoPVPAc and subsequent addition of sulfonated polyether ketone in solution or in the dry form is preferred.

Polycondensation of the polyaramide in the presence of polyvinylpyrrolidone and CoPVPAc and subsequent addition of the sulfonated polyether ketone in solution or in the dry form is preferred in respect of the preparation of the quaternary alloy.

A process in which the polycondensation for the preparation of the polyaramide is carried out in the presence of the sulfonated polyether ketone and, if appropriate, in the presence of polyvinylpyrrolidone and/or CoPVPAc is particularly preferred.

The polymer alloys according to the invention can be isolated from the solutions by removal of the solvent, for example by evaporation, and further processed to intermediate products (granules or powder), which can then be employed as raw materials for the production of shaped articles, films, fibers or coatings.

Advantageous properties of the homogeneously miscible polymer alloys according to the invention which are based on sulfonated polyether ketones and completely aromatic polyaramides are their mechanical properties, which are improved, for example compared with sulfonated polyether ketones, and the improved elongation at break is particularly advantageous (Table 2). Moreover, the hydrophilicity of the alloys can be adjusted in a controlled manner by admixing polyvinylpyrrolidone or CoPVPAc (Table 3).

The invention is illustrated in more detail by the following examples.

EXAMPLES

The following polymers were synthesized:

Polyaramide I (ARA I) with an intrinsic viscosity of 1.0 dl/g, measured in NMP at 25° C., with recurring units of the following formula:

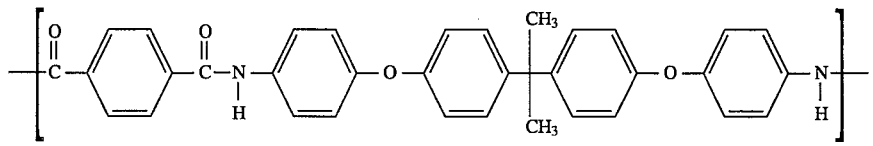

Polyaramide II (ARA II) with an intrinsic viscosity of 0.8 dl/g, measured in NMP at 25° C., with recurring units of the following formula:

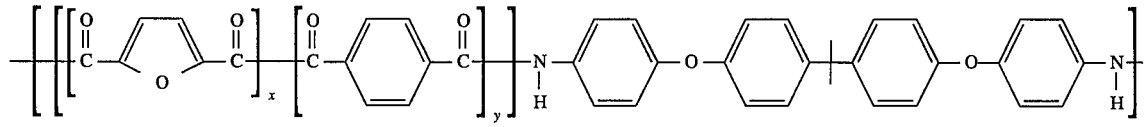

x = y = 0.5

Polyaramide III (ARA III) with an intrinsic viscosity of 1.2 dl/g, measured in NMP at 25° C., with recurring units of the following formula:

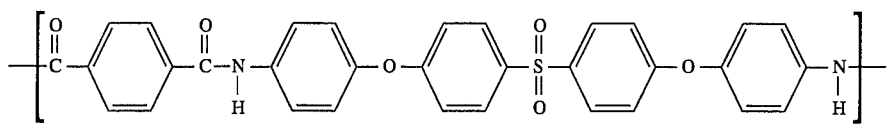

Polyaramide IV (ARA IV) with an intrinsic viscosity of 1.5 dl/g, measured in NMP at 25° C., with recurring units of the following formula:

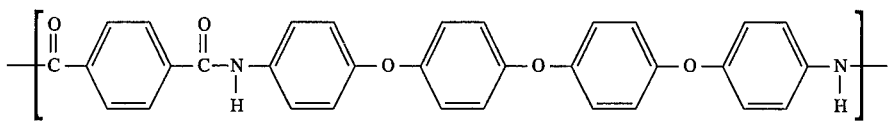

Polyaramide V (ARA V) with an intrinsic viscosity of 3.0 dl/g, measured in $H_2SO_4$ at 25° C., with recurring units of the following formula:

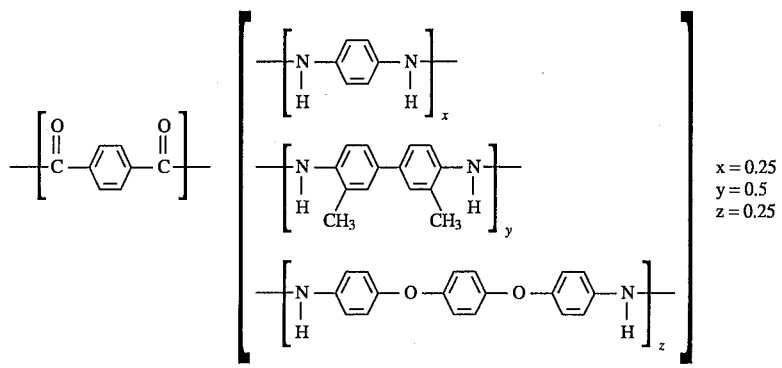

$x = 0.25$
$y = 0.5$
$z = 0.25$

Sulfonated polyether ketone I (PEK-I) with an intrinsic viscosity of 0.7 dl/g, measured in sulfuric acid at 25° C., with recurring units of the following formula

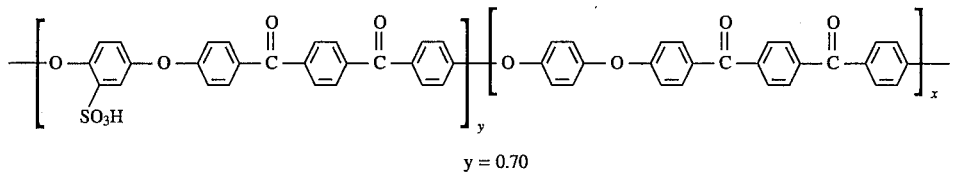

$y = 0.70$

Sulfonated polyether ketone II (PEK-II) with an intrinsic viscosity of 0.65 dl/g, measured in sulfuric acid at 25° C., with recurring units of the following formula

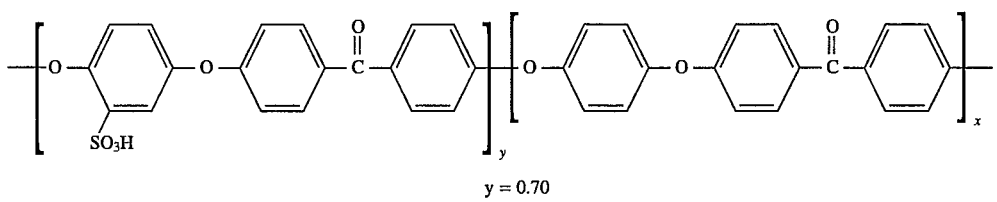

y = 0.70

Sulfonated polyether ketone III (PEK-III) with an intrinsic viscosity of 0.65 dl/g, measured in sulfuric acid at 25° C., with recurring units of the following formula

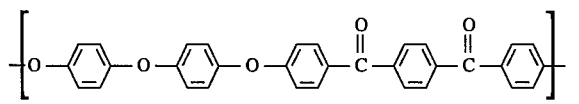

in which 1.38 O-phenylene-O units per recurring unit carry an $SO_3H$ group.

Poly-N-vinylpyrrolidone (PVP, ®Luviskol K30, BASF) and the polymer of N-vinyl-2-pyrrolidone and vinyl acetate (CoPVPAc, ®Kollidon VA 64, BASF) were employed with molecular weights of 40,000, stated as the weight-average.

EXAMPLES 1 TO 13

Preparation of the Alloys

The compositions of the individual alloys are summarized in Table 1.

The sulfonated polyether ketones, the aromatic polyamides and the polyvinylpyrrolidones were dissolved in various weight ratios (cf. Table) in N-methylpyrrolidone (10% strength (w/w) solutions). These solutions were knife-coated onto glass plates. The solvent was then removed (reduced pressure at 80° C. for 24 hours). After drying, the resulting films were watered and dried again several times (reduced pressure at 80° C. for 24 hours). All the films were transparent and ductile, i.e. they could be folded over one another without breaking. Table 2 shows that the yield stress of the sulfonated polyether ketones can be improved by alloying with aromatic polyamides. The hydrophilicity (water absorption) of the alloys can be adjusted in a controlled manner by admixing polyvinylpyrrolidone (cf. Table 3).

EXAMPLE 14 TO 18

Alloys For Fiber Production

To prepare the alloys, 0.4 mol of the diamine components (25 mol % of paraphenylenediamine, 50 mol % of 3,3'-dimethyl-4,4'-diaminobiphenyl and 25 mol % of 1,4-bis(4-aminophenoxy)-benzene) and 1–50% by weight (based on the polymer =134.4 g of aramide in total) of the sulfonated polyether ketone PEK I were dissolved in 2100 ml of NMP. Terephthalic acid dichloride was added to this solution at 70° C. and the polycondensation was started. After addition of CaO (103% (w/w)), the solution is filtered and is finally spun on a spinning unit. The textile data of these fibers are summarized in Table 4:

TABLE 1

Alloys of sulfonated polyether ketones, polyaramides and polyvinylpyrrolidone
Concentrations of the mixture components [in % by weight]

| Examples | ARA I [%] | ARA II [%] | ARA III [%] | ARA IV [%] | ARA V [%] | PEK I [%] | PEK II [%] | PEK III [%] | PVP [%] |
|---|---|---|---|---|---|---|---|---|---|
| 1 | — | — | — | — | — | 100 | — | — | — |
| 2 | 100 | — | — | — | — | — | — | — | — |
| 3 | 75 | — | — | — | — | 25 | — | — | — |
| 4 | 50 | — | — | — | — | 50 | — | — | — |
| 5 | 25 | — | — | — | — | 75 | — | — | — |
| 6 | 50 | — | — | — | — | — | — | 50 | — |
| 7 | 50 | — | — | — | — | — | 50 | — | — |
| 8 | — | 50 | — | — | — | 50 | — | — | — |
| 9 | — | — | 50 | — | — | 50 | — | — | — |
| 10 | — | — | — | 50 | — | 50 | — | — | — |
| 11 | — | — | — | — | 50 | 50 | — | — | — |
| 12 | 33.3 | — | — | — | — | 33.3 | — | — | 33.3 |
| 13 | — | — | — | — | 33.3 | 33.3 | — | — | 33.3 |

TABLE 2

Mechanical data of the films of the polymer alloys according to Examples 1 to 10

| Example | E modulus [GPa] | Elongation at break [MPa] | Yield stress [MPa] |
|---|---|---|---|
| 1 | 3.8 | 24 | 17 |
| 2 | 3.5 | 100 | 52 |
| 3 | 2.8 | 39 | 50 |
| 4 | 2.8 | 20 | 50 |
| 5 | 3.2 | 37 | 39 |
| 6 | 3.1 | 38 | 45 |
| 7 | 3.2 | 31 | 67 |
| 8 | 3.6 | 20 | 55 |
| 9 | 3.4 | 14 | 60 |
| 10 | 2.9 | 57 | 49 |

| | |
|---|---|
| Test apparatus: | ®Instron 4302 (Instron, Offenbach, Germany) |
| Test specimens: | Film cast from solution blends |
| Specimen geometry: | Length: 50 mm |

TABLE 2-continued

Mechanical data of the films of the polymer alloys according to Examples 1 to 10

| Example | E modulus [GPa] | Elongation at break [MPa] | Yield stress [MPa] |
|---|---|---|---|

Test specification:
  Width: 10 mm
  Thickness: 0.25 mm
  1 kN load cell
Clamped length: 35 mm
Measurement of the E modulus with a dynamic displacement transducer
Measurement length: 10 mm
Measurement speed: 1 mm/minute to 0.35 mm elongation
Measurement over the traversed path
Measurement length: 35 mm
Measurement speed: 1 mm/minute to 0.35 mm, then changeover to 50 mm/minute to fracture

TABLE 3

Water absorption test according to ASTM D 4019-81

| Example | [1]Water content % by weight min. | max. | mean | Number of measurements | Standard deviation |
|---|---|---|---|---|---|
| 1 | 11.5 | 12.1 | 11.8 | 4 | ±0.25 |
| 2 | 2.46 | 2.85 | 2.63 | 4 | ±0.19 |
| 3 | 4.52 | 4.90 | 4.72 | 4 | ±0.16 |
| 4 | 6.07 | 6.52 | 6.29 | 5 | ±0.19 |
| 5 | 9.23 | 9.65 | 9.42 | 4 | ±0.20 |
| 12 | 6.61 | 7.10 | 6.88 | 4 | ±0.25 |
| 12 | 12.1 | 12.1 | 12.1 | 2 | ±0.00 |
| 13 | 12.1 | 12.9 | 12.4 | 3 | ±0.40 |

[1]Based on the dry weight

The water absorption capacity of the materials prepared was determined in accordance with ASTM D 4019-81 by storing the specimens at 23° C. and at a relative atmospheric humidity of 85% for at least 210 days. The amounts of water (water content % by weight) released by the specimens at elevated temperature in accordance with the standard mentioned were then determined coulometrically.

TABLE 4

Textile data of the fibers according to Examples 14 to 18

| Example | PEK I [%] | Stretching 1: | Strength [cn/tex] | Elongation [%] | Modulus [N/tex] |
|---|---|---|---|---|---|
| 14 | — | 9.67 | 167 | 3.1 | 56 |
| 15 | 1 | 11.46 | 136 | 2.7 | 54 |
| 16 | 5 | 8.64 | 125 | 2.7 | 49 |
| 17 | 10 | 8.64 | 122 | 2.8 | 50 |
| 18 | 20 | 7.82 | 94 | 2.4 | 44 |

The data shown in Table 4 were recorded in accordance with DIN 53834. Deviations: rate of deformation 10%/minute; measurement of the modulus as the secant modulus at 0.3 to 0.5% elongation.

We claim:

1. A homogeneous polymer alloy comprising a sulfonated aromatic polyether ketone and at least one polyamide as the main constituents, wherein the polyamide is a completely aromatic polyamide.

2. The polymer alloy as claimed in claim 1, which consists of a sulfonated, aromatic polyether ketone and a completely aromatic polyamide.

3. The polymer alloy as claimed in claim 1, which comprises 1 to 99% by weight of at least one sulfonated, aromatic polyether ketone and 1 to 99% by weight of a completely aromatic polyamide, the percentage data relating to the sum of the constituents (sulfonated, aromatic polyether ketone+aromatic polyamide).

4. The polymer alloy as claimed in claim 1, which comprises at least one sulfonated, aromatic polyether ketone built up from recurring units of the formula II

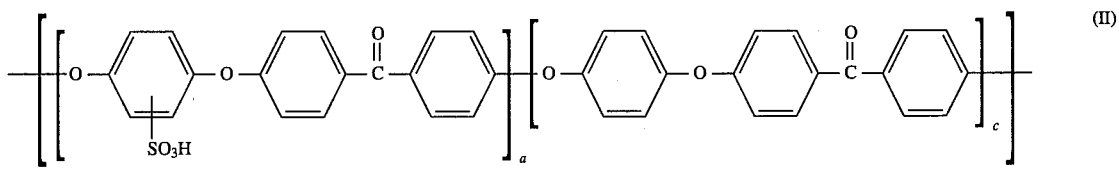

in which a is a number from 0.2 to 1, c is a number from 0 to 0.8 and the sum of a+c=1, of the formula III

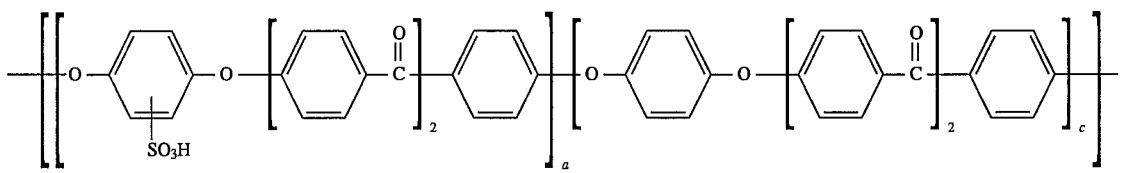
(III)

in which a is a number from 0.2 to 1, c is a number from 0 to 0.8 and the sum of a+c=1, of the formula IV

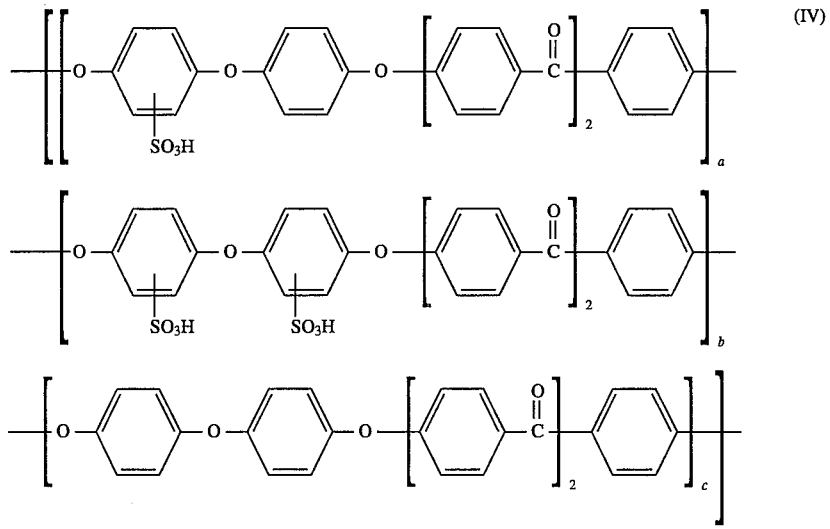
(IV)

in which a is a number from 0 to 1, b is a number from 0 to 1, c is a number from 0 to 0.5 and the sum of a+b+c=1 or mixture thereof.

5. The polymer alloy as claimed in claim 4 wherein a sulfonated copolymer which is built up from at least two different recurring units of the formulae II, III and IV is employed for the sulfonated, aromatic polyether ketone.

6. The polymer alloy as claimed in claim 1, wherein the sulfonated, aromatic polyether ketone has a molecular weight which, stated as the weight-average, is in the range from 10,000 to 60,000 g/mol.

7. The polymer alloy as claimed in claim 1, which comprises at least one completely aromatic copolyamide with contains structural units of the formula V

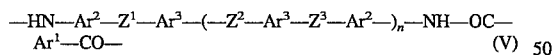  (V)

in which
—$Ar^1$— is a 1,4-phenylene radical, another divalent ($C_6$-$C_{12}$)-aromatic radical, a heteroaromatic radical, a 1,4-phenylene radical containing sulfonic acid groups or ether bridges, another divalent ($C_6$-$C_{12}$)-aromatic radical containing sulfonic acid groups or ether bridges or a heteroaromatic radical containing sulfonic acid groups or ether bridges, said radicals being unsubstituted or substituted by one or two branched or unbranched $C_1$-$C_4$-alkyl or alkoxy radicals or by one or more halogen atoms, —$Ar^2$— and —$Ar^3$— are identical or different 1,2-phenylene, 1,3-phenylene or 1,4-phenylene radicals, or said radicals substituted by one or two branched or unbranched $C_1$-$C_4$-alkyl or alkoxy radicals or by one or more halogen atoms, —$Z^1$—, —$Z^2$— and —$Z^3$— independently of one another are a direct bond or one of the following divalent radicals: —O—, —C(CH$_3$)$_2$—, —C(CF$_3$)$_2$—, —SO$_2$—, or —O—Ar$^2$—O—, and —Ar$^2$— has the abovementioned meaning, and n is 0, 1 or 2.

8. The polymer alloy as claimed in claim 1, which comprises at least one completely aromatic copolyamide with the structural unit —OC—$Ar^1$—CO—,  (A)

and three different structural units of the formulae

  (B)

and

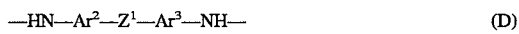  (D)

wherein in each case at least one structural unit B and D is present and $Ar^2$ can have different meanings in B and D, in which —$Ar^1$— is a 1,4-phenylene radical or another divalent ($C_6$-$C_{12}$)-aromatic or heteroaromatic radicals, or said radicals containing sulfonic acid groups or ether bridges, which are unsubstituted or substituted by one or two branched or unbranched $C_1$-$C_4$-alkyl or alkoxy radicals or by one or more halogen atoms, —$Ar^2$— and —$Ar^3$— are identical or different 1,2-phenylene, 1,3-phenylene or 1,4-phenylene radicals, or said radicals substituted by one or two branched or unbranched $C_1$-$C_4$-alkyl or alkoxy radicals or by one or more halogen atoms, —$Z^1$—, —$Z^2$— and —$Z^3$— independently of one another are a direct bond or one of the following divalent radicals: —O—, —C(CH$_3$)$_2$—, —C(CF$_3$)$_2$—, —SO$_2$—, or —O—Ar$^2$—O—, and —Ar$^2$— has the abovementioned meaning.

9. The polymer alloy as claimed in claim 8, wherein —Ar$^1$— in the structural units A is

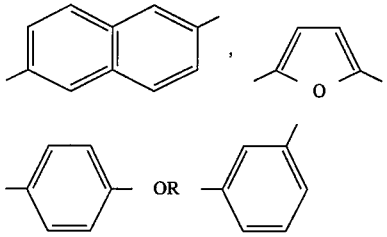

10. The polymer alloy as claimed in claim 8, wherein, in the structural units D of the completely aromatic copolyamide, the radical —Ar$^2$—Z$^1$—Ar$^3$— is chosen from

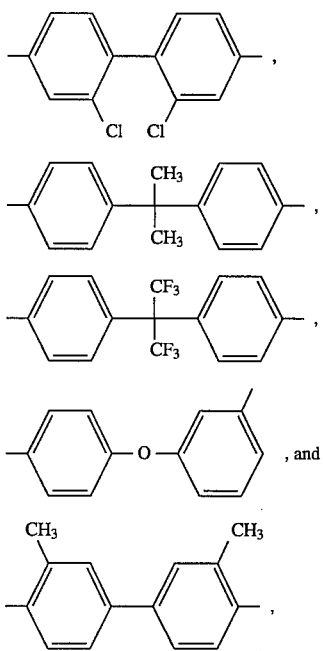

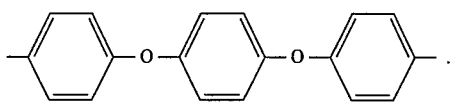

11. The polymer alloy as claimed in claim 8, wherein, in the completely aromatic copolyamide, the structural units A, B and D are present in the molar ratios of B/A=0.3–0.9 and D/A=0.1–0.7 and (B+D)/A=0.9 to 1.1.

12. The polymer alloy as claimed in claim 7, wherein the intrinsic viscosity of the copolyamide used as an alloy component is between 50 and 1000 cm$^3$/g, determined in 96% strength sulfuric acid at 25° C.

13. The homogeneous polymer alloy as claimed in claim 1, which comprises at least one sulfonated, aromatic polyether ketone built up from recurring units of the formula I

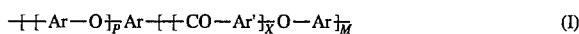

which contains O-phenylene-O units in which

—Ar—, independent from each other, is selected from the group consisting of para-phenylene and meta-phenylene, —Ar'— is a phenylene, naphthylene, biphenylene or anthrylene unit or another divalent aromatic unit, X, M and N independently of one another are zero or 1, Y is zero, 1, 2 or 3 and p is 1, 2, 3 or 4 and the indices p, X and M are coordinated with one another such that p is at least 2–(1–X)·M, and in which, in the formula I, at least 20% and not more than 100% of the O-phenylene-O units are substituted by an SO$_3$H group.

* * * * *